United States Patent
Modha et al.

(10) Patent No.: US 8,914,315 B2
(45) Date of Patent: Dec. 16, 2014

(54) MULTI-COMPARTMENT NEURON SUITABLE FOR IMPLEMENTATION IN A DISTRIBUTED HARDWARE MODEL BY REDUCING COMMUNICATION BANDWIDTH

(75) Inventors: Dharmendra S. Modha, San Jose, CA (US); Steven K. Esser, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 13/360,622

(22) Filed: Jan. 27, 2012

(65) Prior Publication Data
US 2013/0198121 A1    Aug. 1, 2013

(51) Int. Cl.
*G06N 3/04* (2006.01)

(52) U.S. Cl.
USPC ........................................................ 706/26

(58) Field of Classification Search
CPC ...................................................... G06N 3/04
USPC ................................................... 706/25–27
See application file for complete search history.

(56) References Cited

U.S. PATENT DOCUMENTS

| | | | |
|---|---|---|---|
| 3,246,302 A | | 4/1966 | Martin et al. |
| 5,321,639 A | | 6/1994 | Krishnamoorthy et al. |
| 2007/0022070 A1 | | 1/2007 | Wells et al. |
| 2008/0258767 A1 | * | 10/2008 | Snider et al. ............ 326/46 |
| 2010/0076916 A1 | * | 3/2010 | van der Made ........... 706/27 |
| 2011/0035215 A1 | | 2/2011 | Sompolinsky et al. |
| 2013/0031040 A1 | * | 1/2013 | Modha ..................... 706/27 |
| 2013/0073493 A1 | * | 3/2013 | Modha ..................... 706/25 |
| 2013/0073494 A1 | * | 3/2013 | Modha ..................... 706/25 |
| 2013/0073497 A1 | * | 3/2013 | Akopyan et al. ........ 706/27 |

OTHER PUBLICATIONS

Snider G., "Spike-Timing-Dependent Learning in Memristive Nanodevices", 2008 IEEE/ACM International Symposium on Nanoscale Architectures (NANOARCH 2008), pp. 85-92, 2008.*
Snider G., "Self-organized computation with unreliable, memristive nanodevices", Nanotechnology 18 (2007), pp. 1-13, 2007.*
Graas E. et al., "An FPGA-Based Approach to High-Speed Simulation of Conductance-Based Neuron Models", Neuroinformatics, vol. 2, pp. 417-435, 2004.*

(Continued)

*Primary Examiner* — Jeffrey A Gaffin
*Assistant Examiner* — Dave Misir
(74) *Attorney, Agent, or Firm* — Kenneth L. Sherman, Esq.; Michael Zarrabian, Esq.; Sherman & Zarrabian LLP

(57) ABSTRACT

Embodiments of the present invention provide a neural module comprising a multilevel hierarchical structure of neural compartments. Each neural compartment is interconnected to one or more neural compartments of a previous level and a next hierarchical level in the hierarchical structure. Each neural compartment integrates spike signals from interconnected neural compartments of a previous hierarchical level, generates a spike signal in response to the integrated spike signals reaching a threshold of said neural compartment, and delivers a generated spike signal to interconnected neural compartments of a next hierarchical level. Each neural compartment is further interconnected to one or more external spiking systems, such that said neural compartment integrates spike signals from interconnected external spiking systems, and delivers a generated spike signal to interconnected external spiking systems. The neural compartments of a neural module include one soma compartment and a plurality of dendrite compartments. Each neural compartment is excitatory or inhibitory.

24 Claims, 10 Drawing Sheets

(56) References Cited

OTHER PUBLICATIONS

Indiveri G. et al., "Neuromorphic silicon neuron circuits", frontiers in Neuroscience, May 2011, vol. 5, Article 73, pp. 1-23.*

Pottala, E.W. et al., "A Dendritic Compartment Model Neuron", IEEE Transactions on Biomedical Engineering, Mar. 1973, pp. 132-139, vol. BME-20, No. 2, IEEE Press, United States.

Medvedev, G.S., "Electrical Coupling Promotes Fidelity of Responses in the Networks of Model Neurons", Neural Computation, Nov. 2009, pp. 3057-3078, vol. 21, No. 11, Massachusetts Institute of Technology, United States.

Huys, Q.J.M. et al., "Efficient Estimation of Detailed Single-Neuron Models", Journal Neurophysiology, Apr. 26, 2006, pp. 872-890, vol. 96, No. 2, The American Physiological Society, United States.

Eberhard, J.P. et al., "NeuGen: A Tool for the Generation of Realistic Morphology of Cortical Neurons and Neural Networks in 3D", Neurocomputing, Jan. 12, 2006, pp. 327-342, vol. 70, No. 1-3, Elsevier B.V., Netherlands.

Riesenhuber, M. et al., "Hierarchical Models of Object Recognition in Cortex", Nature Neuroscience, Nov. 1999, pp. 1019-1025, vol. 2, No. 11, Nature America Inc., United States.

* cited by examiner

MULTI-COMPARTMENT NEURON SUITABLE FOR IMPLEMENTATION IN A DISTRIBUTED HARDWARE MODEL BY REDUCING COMMUNICATION BANDWIDTH

This invention was made with Government support under HR0011-09-C-0002 awarded by Defense Advanced Research Projects Agency (DARPA). The Government has certain rights in this invention.

BACKGROUND

The present invention relates to neuromorphic and synaptronic computation, and in particular, a multi-compartment neuron (i.e., neural module) suitable for implementation in a distributed hardware model by reducing communication bandwidth.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

Embodiments of the present invention provide a scalable neuromorphic and synaptronic architecture that provides locality and massive parallelism to enable a low-power, compact hardware implementation. In one embodiment, the present invention provides a neural module comprising a multilevel hierarchical structure of neural compartments. Each neural compartment is interconnected to one or more neural compartments of a previous level and a next hierarchical level in the hierarchical structure. Each neural compartment integrates spike signals from interconnected neural compartments of a previous hierarchical level, generates a spike signal in response to the integrated spike signals reaching a threshold of said neural compartment, and delivers a generated spike signal to interconnected neural compartments of a next hierarchical level. Each neural compartment is further interconnected to one or more external spiking systems, such that said neural compartment integrates spike signals from interconnected external spiking systems, and delivers a generated spike signal to interconnected external spiking systems. The neural compartments of a neural module include one soma compartment and a plurality of dendrite compartments. Each neural compartment is excitatory or inhibitory.

In another embodiment, the present invention provides a method comprising producing spiking computation in a neural module. The neural module comprises a multilevel hierarchical structure of neural compartments. Each neural compartment is interconnected to one or more neural compartments of a previous level and a next hierarchical level in the hierarchical structure. The spiking computation comprises, for each neural compartment, integrating spike signals from interconnected neural compartments of a previous hierarchical level. The spiking computation further comprises, for each neural compartment, generating a spike signal in response to the integrated spike signals reaching a threshold of said neural compartment, and delivering a generated spike signal to interconnected neural compartments of a next hierarchical level. Each neural compartment is further interconnected to one or more external spiking systems. The spiking computation further comprises, for each neural compartment, integrating spike signals from interconnected external spiking systems, and delivering a generated spike signal to interconnected external spiking systems.

In yet another embodiment, the present invention provides a non-transitory computer-useable storage medium for producing spiking computation in a neural module. The neural module comprises a multilevel hierarchical structure of neural compartments. Each neural compartment is interconnected to one or more neural compartments of a previous hierarchical level and a next hierarchical level in the hierarchical structure. The computer-useable storage medium has a computer-readable program. The program upon being processed on a computer causes the computer to implement the steps of, in each neural compartment, integrating spike signals from interconnected neural compartments of a previous hierarchical level, generating a spike signal in response to the integrated spike signals reaching a threshold of said neural compartment, and delivering a generated spike signal to interconnected neural compartments of a next hierarchical level.

These and other features, aspects and advantages of the present invention will become understood with reference to the following description, appended claims and accompanying figures.

DETAILED DESCRIPTION

Figure 1A:
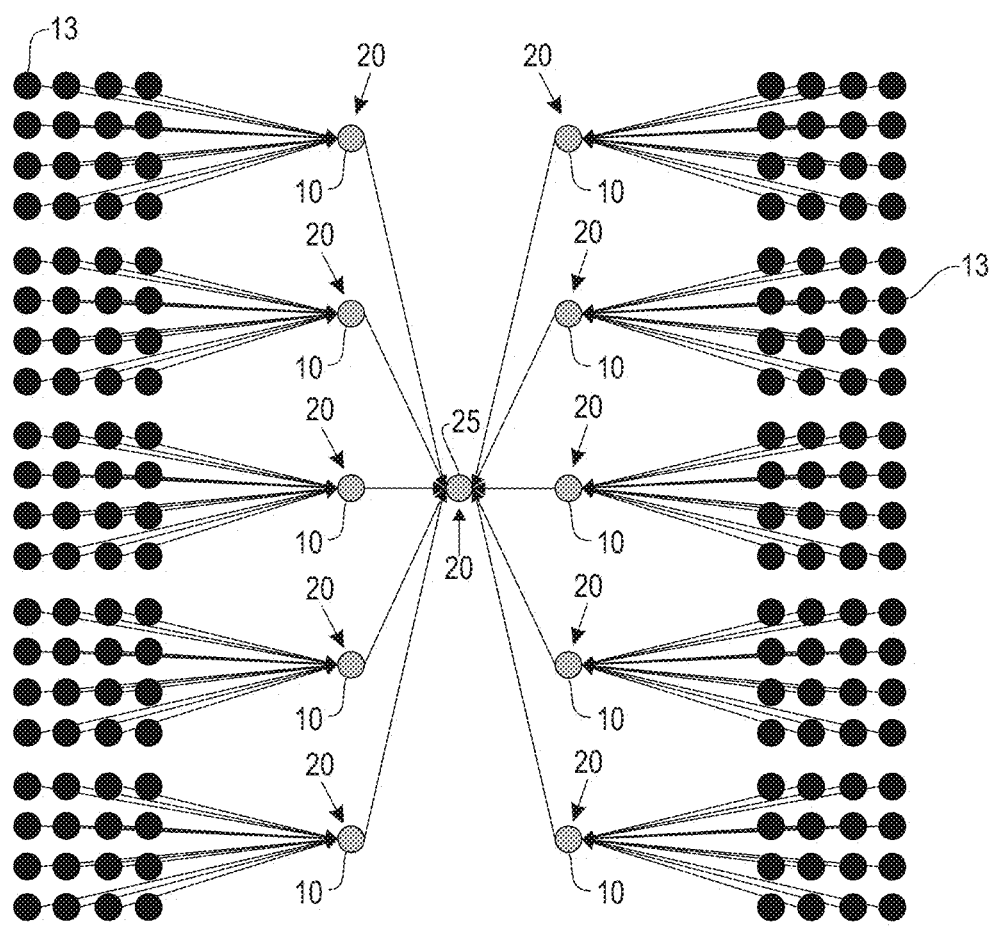
FIG. 1A shows a diagram of a multi-compartment neuron, in accordance with an embodiment of the invention.

The present invention relates to neuromorphic and synaptronic computation, and in particular, a multi-compartment neuron (i.e., neural module) suitable for implementation in a distributed hardware model by reducing communication bandwidth. In one embodiment, the present invention provides a neural module comprising a multilevel hierarchical structure of neural compartments. Each neural compartment is interconnected to one or more neural compartments of a previous level and a next hierarchical level in the hierarchical structure. Each neural compartment integrates spike signals from interconnected neural compartments of a previous hierarchical level, generates a spike signal in response to the integrated spike signals reaching a threshold of said neural compartment, and delivers a generated spike signal to interconnected neural compartments of a next hierarchical level. Each neural compartment is further interconnected to one or more external spiking systems, such that said neural compartment integrates spike signals from interconnected external spiking systems, and delivers a generated spike signal to interconnected external spiking systems. The neural compartments of a neural module include one soma compartment and a plurality of dendrite compartments. Each neural compartment is excitatory or inhibitory.

In another embodiment, the present invention provides a method comprising producing spiking computation in a neural module. The neural module comprises a multilevel hierarchical structure of neural compartments. Each neural compartment is interconnected to one or more neural compartments of a previous level and a next hierarchical level in the hierarchical structure. The spiking computation comprises, for each neural compartment, integrating spike signals from interconnected neural compartments of a previous hierarchical level. The spiking computation further comprises, for each neural compartment, generating a spike signal in response to the integrated spike signals reaching a threshold of said neural compartment, and delivering a generated spike signal to interconnected neural compartments of a next hierarchical level. Each neural compartment is further interconnected to one or more external spiking systems. The spiking computation further comprises, for each neural compartment, integrating spike signals from interconnected external spiking systems, and delivering a generated spike signal to interconnected external spiking systems.

In yet another embodiment, the present invention provides a non-transitory computer-useable storage medium for producing spiking computation in a neural module. The neural module comprises a multilevel hierarchical structure of neural compartments. Each neural compartment is interconnected to one or more neural compartments of a previous hierarchical level and a next hierarchical level in the hierarchical structure. The computer-useable storage medium has a computer-readable program. The program upon being processed on a computer causes the computer to implement the steps of, in each neural compartment, integrating spike signals from interconnected neural compartments of a previous hierarchical level, generating a spike signal in response to the integrated spike signals reaching a threshold of said neural compartment, and delivering a generated spike signal to interconnected neural compartments of a next hierarchical level.

An external spiking system may be another neural module, a sensory module, or a motor module. Each neural compartment comprises multiple input ports for receiving spike signals, an integrator unit for integrating the spike signals received, and a threshold check unit for determining whether the integrated spike signals reach the threshold of said neural compartment.

In one implementation, the multilevel hierarchical structure is a tree structure. In another implementation, the multilevel hierarchical structure comprises a root level comprising one neural compartment and a leaf level comprising a plurality of neural compartments. The neural compartment of the root level is a soma compartment, and each neural compartment of the leaf level is a dendrite leaf compartment. In one implementation, the soma compartment of the root level is interconnected to every dendrite leaf compartment of the leaf level. In another implementation, the multilevel hierarchical structure further comprises zero or more intermediate levels, wherein each intermediate level comprises a plurality of neural compartments, and each neural compartment of an intermediate level is a dendrite branch compartment.

Each dendrite branch compartment is interconnected to one or more dendrite branch compartments of a previous intermediate level and a next intermediate level, if any. The dendrite branch compartments of a first intermediate level are interconnected to multiple dendrite leaf compartments of the leaf level. The dendrite branch compartments of a last intermediate level are interconnected to the soma compartment of the root level.

The plurality of dendrite leaf compartments of the leaf level is divided into a first and a second population of dendrite leaf compartments. Each dendrite leaf compartment of the first population of dendrite leaf compartments receives excitatory spike signals and inhibitory spike signals, and generates an excitatory spike signal in response to the integrated spike signals reaching a threshold of said dendrite leaf compartment. Each dendrite leaf compartment of the second population of dendrite leaf compartments receives inhibitory spike signals, and generates an inhibitory spike signal in response to the integrated spike signals reaching a threshold of said dendrite leaf compartment.

For each intermediate level, the plurality of dendrite branch compartments of said intermediate level is divided into a first and a second population of dendrite branch compartments. Each dendrite branch compartment of the first population of dendrite branch compartments receives excitatory spike signals and inhibitory spike signals, and generates an excitatory spike signal in response to the integrated spike signals reaching a threshold of said dendrite leaf compartment. Each dendrite branch compartment of the second population of dendrite branch compartments receives inhibitory spike signals, and generates an inhibitory spike signal in response to the integrated spike signals reaching a threshold of said dendrite leaf compartment.

The soma compartment of the root level delivers a backspike signal to neural compartments of a previous hierarchical level when the soma compartment generates a spike signal. Each dendrite branch compartment delivers a backspike signal to neural compartments of a previous hierarchical level when said dendrite branch compartment receives a backspike signal.

The neural module may be organized into a neural network including multiple neural modules interconnected via an interconnection network comprising multiple digital synapses, wherein each synapse interconnects one neural module to another neural module. A soma compartment of each neural module is interconnected to one or more of the following: dendrite leaf compartments of other neural modules, and external spiking systems. Each dendrite leaf compartment of each neural module is interconnected to one or more of the following: soma compartments of other neural modules, and external spiking systems.

In one implementation, the neural network is instantiated using distributed hardware architecture, such that, for each neural module, all operational states of said neural module are computed by a corresponding processor. The neural modules in the neural network communicate using spikes.

In another implementation, the neural network is instantiated using a hardware architecture comprising multiple core circuits, such that, for each neural module, all operational states of said neural module are computed by a corresponding core circuit. The neural modules in the neural network communicate using spikes. Each core circuit comprises an electronic synapse array including multiple digital synapses interconnecting a plurality of digital electronic neurons, wherein each neuron represents a neural compartment.

Embodiments of the present invention provide a scalable neuromorphic and synaptronic architecture that provides locality and massive parallelism to enable a low-power, compact hardware implementation.

A multi-compartment neuron is an artificial neuron divided into multiple compartments, such as dendrite compartments and a soma compartment. Each compartment receives inputs, computes a function based on the inputs received, and delivers the results of the function to other compartments that may be in the in the same or different multi-compartment neuron. For instance, a multi-compartment neuron may have leaf compartments configured to receive input from other neurons, and a soma compartment that sends signals to the leaf compartments of other multi-compartment neurons.

Multi-compartment neurons are advantageous over single compartment neurons for computational reasons, as each compartment can compute some local function on its inputs thereby providing a richer neural response repertoire. Multi-compartment neurons are also advantageous for communication reasons. For example, if the number of inputs each compartment can receive is limited, each compartment can collect a small number of inputs and those inputs can be aggregated through communication between compartments, thereby allowing the neuron as a whole to collect a larger number of inputs than any one compartment can receive.

In a typical multi-compartment neuron, a neuron may have tens or even thousands of compartments, each connected to some, usually a small subset of, other compartments. Each compartment has a membrane potential. The membrane potential is a local state variable that changes dependent on time, local synaptic activations, and the membrane potential of connected compartments. Performing this computation thus requires sharing membrane potential values between neighboring compartments. As membrane potential is typically a continuous value number, if compartments are computed in a distributed fashion, then sharing membrane potential values between compartments will impose a high communication cost.

Embodiments of the present invention provide a system ideally suited for distributed processing of dendrites. In this system, each compartment produces a spike if its own membrane potential reaches a sufficient threshold. Those spikes are then transferred to connected compartments. The membrane potential in each of these compartments can change dependent on time, local synaptic activations and spikes received from other compartments. As compartment spikes typically occur relatively infrequently and are binary signals, considerably less bandwidth is required then if the compartment's membrane potential were communicated each time step.

The term electronic neuron as used herein represents an architecture configured to simulate a biological neuron. An electronic neuron creates connections between processing elements that are roughly functionally equivalent to neurons of a biological brain. As such, a neuromorphic and synaptronic computation comprising electronic neurons according to embodiments of the invention may include various electronic circuits that are modeled on biological neurons. Further, a neuromorphic and synaptronic computation comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic computation according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment or an embodiment containing both hardware and software elements.

In multi-layered neural networks, a neuron may receive multiple inputs. As the number of inputs per neuron increases, the amount of power consumed also increases. As such, hardware problems may result with increasing inputs per neuron. For instance, wiring length increases, connectivity becomes more block-like, and the hardware architecture becomes inefficient if few total inputs are required per neuron.

The present invention provides a multi-compartment neuron (i.e., neural module) comprising multiple neural compartments. As later described in detail herein, each compartment emits a spike (i.e., a binary signal) if its own membrane potential reaches a spike threshold specific to said compartment. The spikes are transmitted to connected compartments. The membrane potential of each compartment changes dependent on time, local synaptic activation, and spikes received from other connected compartments. As spikes occurs relatively infrequently and only requires two bits of information to transmit, the present invention requires considerably less bandwidth than when sharing membrane potential values (that are continuous value numbers) between compartments.

FIG. 1A shows a diagram of a multi-compartment neuron 5, in accordance with an embodiment of the invention. The multi-compartment neuron 5 comprises a multi-level hierarchical structure of neural compartments ("compartments") 20. Specifically, the multi-compartment neuron 5 comprises multiple dendrite compartments 10 interconnected to a soma compartment 25. The compartments 20 are interconnected using synaptic connections such as a synaptic crossbar array 12 (FIG. 1B).

As later described in detail herein, each compartment 20 receives incoming synaptic spikes as binary signals from other compartments. Each compartment 20 integrates the incoming spikes received. For each compartment 20, if the integrated synaptic spikes reach a spike threshold, the compartment 20 emits a synaptic spike that is transmitted to other compartments 20 using synaptic connections such as the synaptic crossbar array 12 (FIG. 1B).

Also shown FIG. 1A, some compartments 20 are configured to receive input from receptive fields 13.

Figure 1B:
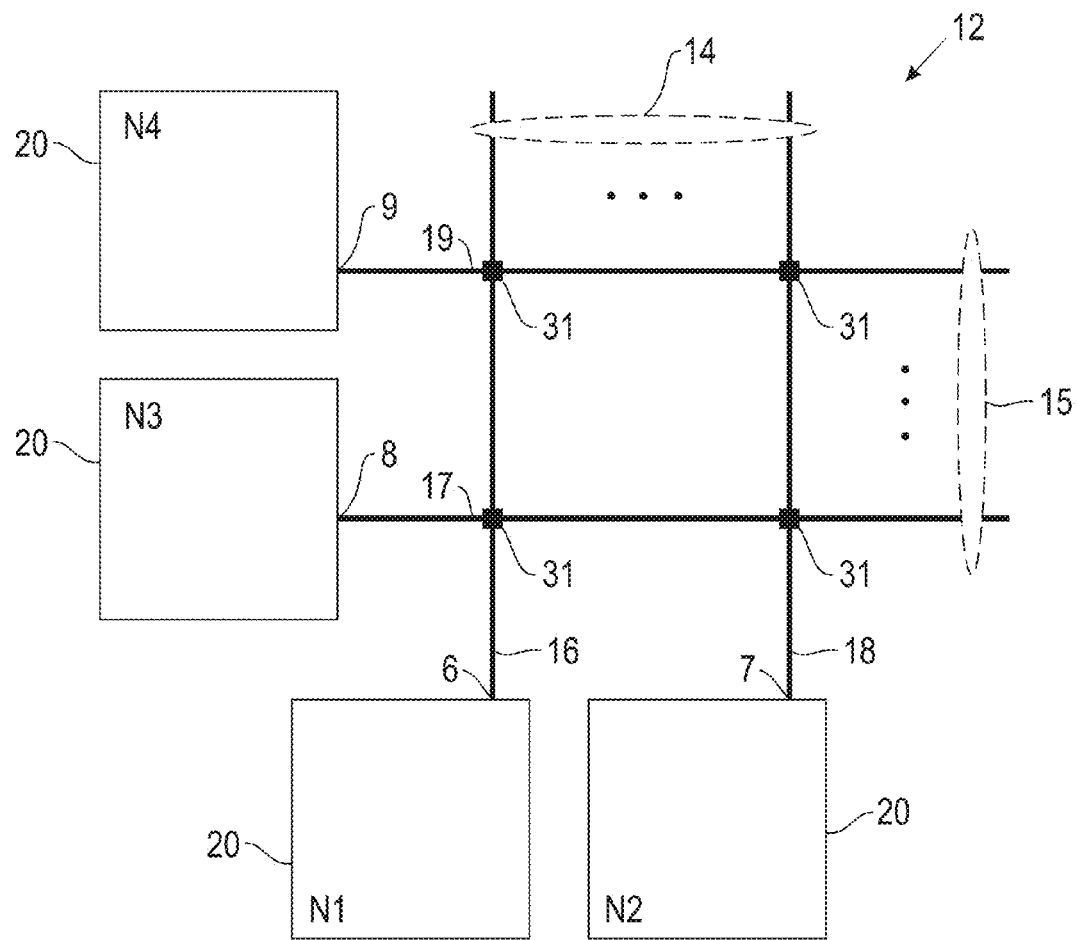
FIG. 1B shows a diagram of a synaptic crossbar array, in accordance with an embodiment of the invention.

FIG. 1B shows a diagram of a synaptic crossbar array 12, in accordance with an embodiment of the invention. In one example, the crossbar 12 may comprise an "ultra-dense crossbar array" that may have a pitch in the range of about 0.1 nm to 10 μm. Said crossbar 12 interconnects a plurality of compartments 20, such as compartments N1, N2, N3 and N4. For illustration purposes, the crossbar 12 provides symmetric connections between two pairs of compartments 20 (e.g., N1 and N3). However, embodiments of the invention are not only useful with such symmetric connection of compartments 20, but also useful with asymmetric connection of compartments 20 (i.e., compartments N1 and N3 need not be connected with the same connection).

As shown in FIG. 1B, the compartments 20 are connected to the crossbar 12 via dendrite paths/wires (dendrites) 14 such as dendrites 16 and 18. The compartments 20 are also connected to the crossbar 12 via axon paths/wires (axons) 15 such as axons 17 and 19. The compartments N1 and N2 are dendritic compartments and the compartments N3 and N4 are axonal compartments. Specifically, the compartments N1 and N2 are shown with outputs 6 and 7 connected to the dendrites (e.g., bitlines) 16 and 18, respectively. Axonal compartments N3 and N4 are shown with outputs 8 and 9 connected to the axons (e.g., wordlines or access lines) 17 and 19, respectively. Each connection between the dendrites 16, 18 and the axons 17, 19 are made through a digital synapse device 31 ("synapse"). The junctions where the synapses 31 are located may be referred to herein as "cross-point junctions". The crossbar 12 accommodates the appropriate ratio of the synapses 31 to the compartments 20, and, hence, need not be square.

In general, in accordance with an embodiment of the invention, the compartments N1 and N2 will "fire" (transmit a synaptic spike) in response to the inputs they receive from axonal input connections (not shown) reaching a spike threshold. Compartments N3 and N4 will "fire" (transmit a synaptic spike) in response to the inputs they receive from external input connections (not shown), typically from other compartments 20, reaching a spike threshold. In one embodiment, when the compartments N1 and N2 fire they maintain a postsynaptic-STDP (post-STDP) variable that decays. For example, in one embodiment, the decay period may be 50 ms. The post-STDP variable is used to achieve STDP by encoding the time since the last firing of the associated neuron. Such STDP is used to control long-term potentiation or "potentiation", which in this context is defined as increasing synaptic conductance. When the compartments N3 and N4 fire they maintain a presynaptic-STDP (pre-STDP) variable that decays in a similar fashion as that of the compartments N1 and N2.

Pre-STDP and post-STDP variables may decay according to exponential, linear, polynomial, or quadratic functions, for example. In another embodiment of the invention, the variables may increase instead of decrease over time. In any event, this variable may be used to achieve STDP by encoding the time since the last firing of the associated compartment. STDP is used to control long-term depression or "depression", which in this context is defined as decreasing synaptic conductance. Note that the roles of pre-STDP and post-STDP variables can be reversed with pre-STDP implementing potentiation and post-STDP implementing depression.

An external two-way communication environment may supply sensory inputs and consume motor outputs. A digital compartment 20 may be implemented using complementary-symmetry metal-oxide-semiconductor (CMOS) logic gates that receive spike inputs and integrate them. In one embodiment, the compartment 20 includes comparator circuits that generate spikes when the integrated input reaches a spike threshold. In one embodiment, binary synapses 31 are implemented using transposable 1-bit static random-access memory (SRAM) cells, wherein each compartment 20 can be an excitatory or inhibitory compartment (or both). This assumes a transposable access to the crossbar memory array. Compartments 20 that spike are selected one at a time sending spike events to corresponding axons.

Figure 1C:
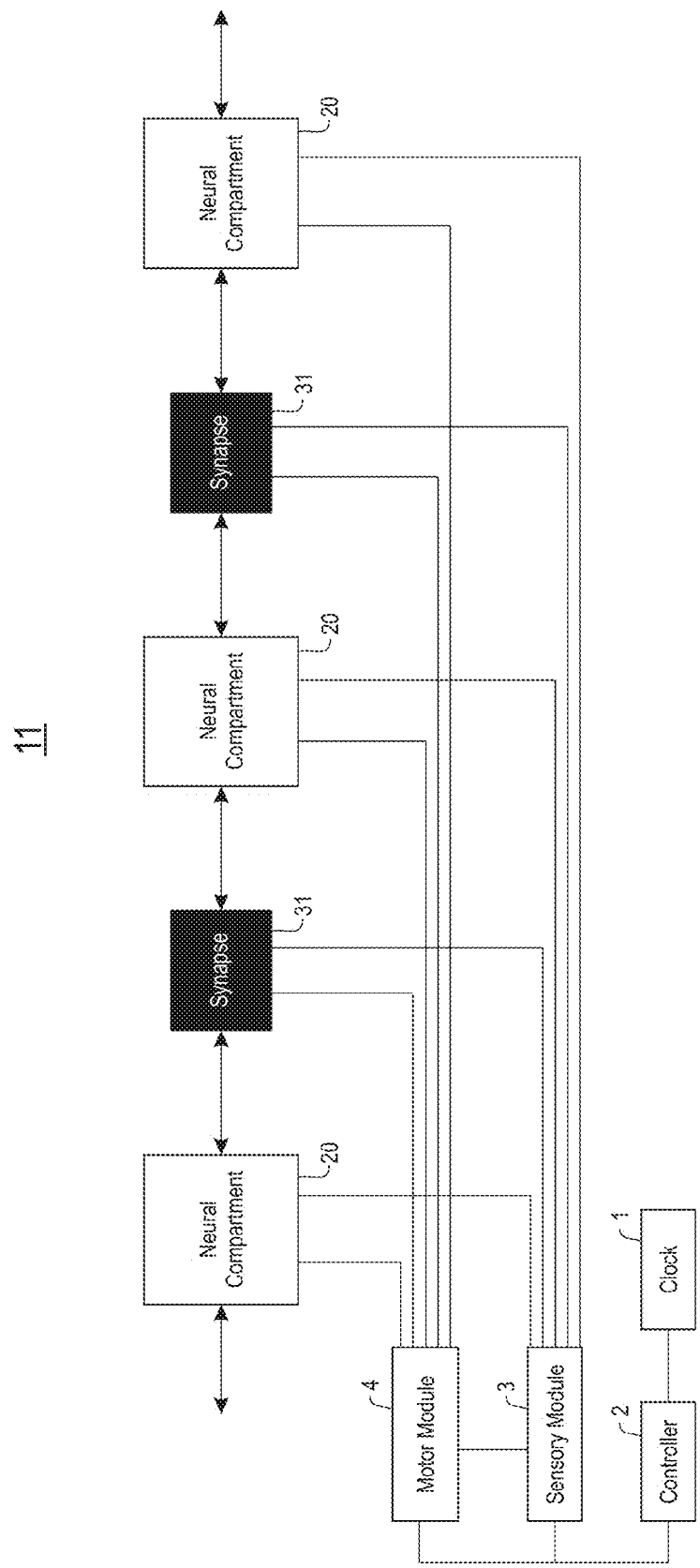
FIG. 1C illustrates a neural network comprising multiple interconnected neural compartments, in accordance with an embodiment of the invention.

FIG. 1C illustrates a neural network 11 comprising multiple interconnected neural compartments 20, in accordance with an embodiment of the invention. Multiple synapses 31 interconnect the compartments 20. Each compartment 20 of a multi-compartment neuron 5 (FIG. 1A) may also be connected to external spiking systems such as other neural modules (i.e., other multi-compartment neurons 5), motor modules 4, and sensory modules 3. A compartment 20 of a multi-compartment neuron 5 may be interconnected to another compartment 20 in the same, or a different, multi-compartment neuron 5. A motor module 4 represents a motor control system configured to provide motor output. A sensory module 3 represents a sensory transducer configured to provide sensory input.

Also shown in FIG. 1C, the neural network 11 further comprises a control module ("controller") 2 that is connected to a clock 1. The clock 1 produces clock signals used by the controller 2 to generate time-steps. The controller 2 divides each time-step into operational phases in the neural network 11 for compartment 20 updates, etc.

Figure 2:
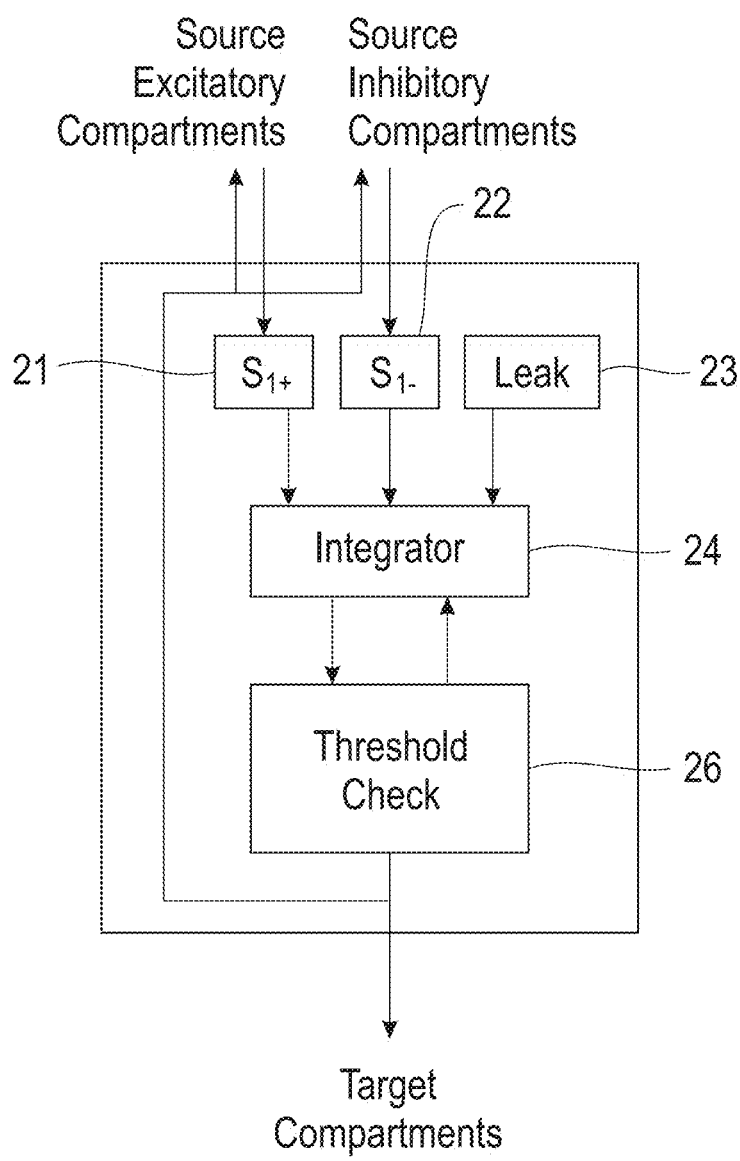
FIG. 2 illustrates a block diagram of an example compartment of a multi-compartment neuron, in accordance with an embodiment of the invention.

FIG. 2 illustrates a block diagram of a compartment 20 within a multi-compartment neuron 5, in accordance with an embodiment of the invention. Each compartment 20 is configured to communicate with other compartments 20 within the same multi-compartment neuron 5 or different multi-compartment neurons 5 using spiking communication. As later described in detail herein, each compartment 20 receives incoming synaptic spikes (i.e., binary signals), integrates the synaptic spikes received, and emits a synaptic spike if the integrated synaptic spikes reach a spike threshold.

Each compartment 20 has a set of parameters provided by Table 1 below. Let i generally denote a compartment 20. All parameters are integers. Each compartment 20 can be individually customized using its parameters.

TABLE 1

| Parameter Symbol | Parameter |
|---|---|
| $E_i$ | The compartment type of the compartment i. If $E_i = 0$, the compartment i is an inhibitory compartment. If $E_i = 1$, the compartment i is an excitatory compartment. |
| $\theta_i$ | The spike threshold of the compartment i. |
| $\rho_i$ | The reset value of the membrane potential variable $V_i$. |
| $\lambda_i$ | The leak rate of the compartment i. |
| $s_{+,i}$ | The synaptic excitation strength to the compartment i. |
| $s_{-,i}$ | The synaptic inhibition strength to the compartment i. |

Each compartment 20 also has a set of variables provided by Table 2 below. All variables are positive integers.

TABLE 2

| Variable Symbol | Variable |
|---|---|
| $V_i$ | The membrane potential variable of the compartment i. $V_i$ is a non-negative integer, wherein if $V_i$ is zero, $V_i - 1$ is also zero. |
| $n_{+,i}$ | The number of excitatory synaptic spikes received by the compartment i in a time step. |
| $n_{-,i}$ | The number of inhibitory synaptic spikes received by the compartment i in a time step. |

As illustrated in FIG. 2, the compartment 20 comprises multiple input ports, such as an excitatory synaptic input port 21 and an inhibitory input port 22. Each input port 21, 22 is configured to receive incoming binary signals from source compartments, wherein the source compartments are other compartments 20 that may be within the same multi-compartment neuron 5, or other multi-compartment neurons 5.

Specifically, the excitatory input port 21 is configured to receive excitatory synaptic spikes from excitatory compartments (i.e., compartments 20 wherein $E_i=1$). The inhibitory input port 22 is configured to receive inhibitory synaptic spikes from inhibitory compartments (i.e., compartments 20 wherein $E_i=0$).

Figure 5:
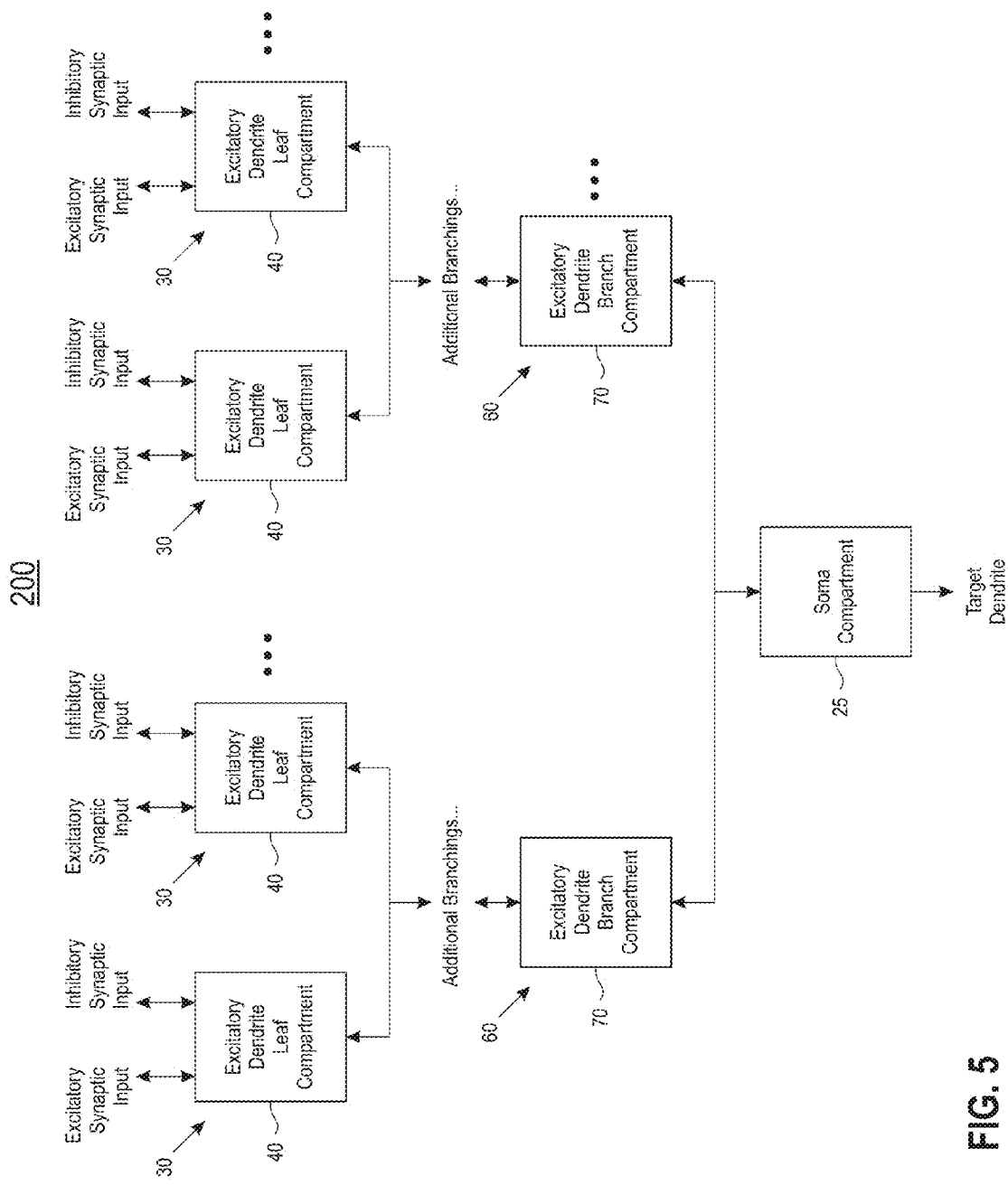
FIG. 5 illustrates a block diagram of an example multi-compartment neuron with branching structure, in accordance with an embodiment of the invention.

A compartment 20 may be categorized as one of the following three types: a soma compartment 25 (FIG. 3), a dendrite leaf compartment 30 (FIG. 3), and a dendrite branch compartment 60 (FIG. 5). A dendrite leaf compartment and a dendrite branch compartment are henceforth both also referred to as dendrite compartments 10 (FIG. 1). As stated above, each multi-compartment neuron 5 comprises a multi-level hierarchical structure of compartments 20. The multi-level hierarchical structure of each multi-compartment neuron 5 comprises a root level comprising one soma compartment 25, and a leaf level comprising a plurality of dendrite leaf compartments 30.

The compartment 20 further comprises a leak unit 23, an integrator unit ("integrator") 24, and a threshold check unit 26. The integrator 24 integrates all incoming binary signals received into the membrane potential variable $V_i$.

The integrator 24 of an excitatory compartment (i.e., $E_i=1$) that is a dendrite compartment 10 or a soma compartment 25, or an inhibitory compartment (i.e., $E_i=0$) that is a soma compartment 25, may update the membrane potential variable $V_i$ using the following example formula: $V_i(t)=V_i(t-1)-\lambda_i+s_{+,i}n_{+,i}-s_{-,i}n_{-,i}$, wherein t denotes the current time step. For each excitatory synaptic spike received, the integrator 24 increases the membrane potential variable $V_i$ by the amount $s_{+,i}$. For each inhibitory synaptic spike received, the integrator 24 decreases the membrane potential variable $V_i$ by the amount $s_{-,i}$.

The integrator 24 of an inhibitory compartment (i.e., $E_i=0$) that is a dendrite compartment 10 may update the membrane potential variable $V_i$ using the following example formula: $V_i(t)=V_i(t-1)-\lambda_i-s_{+,i}n_{+,i}+s_{-,i}n_{-,i}$, wherein t denotes the current time step. For each excitatory synaptic spike received, the integrator 24 decreases the membrane potential variable $V_i$ by the amount $s_{+,i}$. For each inhibitory synaptic spike received, the integrator 24 increases the membrane potential variable $V_i$ by the amount $s_{-,i}$.

A digital clock signal provides time steps. In one example implementation, the integrator 24 updates the membrane potential variable $V_i$ once per time step. In another example implementation, the leak unit 23 applies the leak rate $\lambda_i$ once per time step, and the integrator 24 integrates the incoming binary signals as they are received by the input ports 21 and 22.

The threshold check unit 26 determines if the membrane potential variable $V_i$ reaches the spike threshold $\theta_i$ of the compartment 20. If the membrane potential variable $V_i$ reaches the spike threshold $\theta_i$, the membrane potential variable $V_i$ is set to the reset value $\rho_i$ and the compartment 20 spikes. The spiking compartment 20 forward routes a spike to target compartments, wherein the target compartments are other compartments 20 that may be within the same multi-compartment neuron 5 or other multi-compartment neurons 5.

If the spiking compartment 20 is an inhibitory compartment (i.e., $E_i=0$), the spiking compartment 20 forward routes an inhibitory synaptic spike to the target compartments. For each target compartment, the inhibitory synaptic spike forward routed is applied to the number of inhibitory synaptic spikes received $n_{-,i}$ of the target compartment.

If the spiking compartment 20 is an excitatory compartment (i.e., $E_i=1$), the spiking compartment 20 forward routes an excitatory synaptic spike to the target compartments. For each target compartment, the excitatory synaptic spike forward routed is applied to the number of excitatory synaptic spikes received $n_{+,i}$ of the target compartment.

In one example implementation, the threshold check unit 26 is activated once per time step. The threshold check unit 26 determines if the membrane potential variable $V_i$ reaches the spike threshold $\theta_i$ at the end of each time step. In another example implementation, the threshold check unit 26 is activated for each incoming spike. The threshold check unit 26 determines if the membrane potential variable $V_i$ reaches the spike threshold $\theta_i$ each time a binary signal is received by the input ports 21 or 22.

A dendrite leaf compartment 30 may be an excitatory dendrite leaf compartment 40 (FIG. 3) with an $E_i=1$, or an inhibitory dendrite leaf compartment 50 (FIG. 4) with an $E_i=0$. An excitatory dendrite leaf compartment 40 is configured to receive as binary signals both excitatory synaptic spikes and inhibitory synaptic spikes from soma compartments 25 of other multi-compartment neurons 5. An inhibitory dendrite leaf compartment 50 is configured to receive as binary signals only inhibitory synaptic spikes from soma compartments 25 of other multi-compartment neurons 5. Synaptic spikes are received by the dendrite leaf compartments 40, 50 via synaptic connections such as the synaptic cross-bar array 12 (FIG. 1B).

Figure 6:
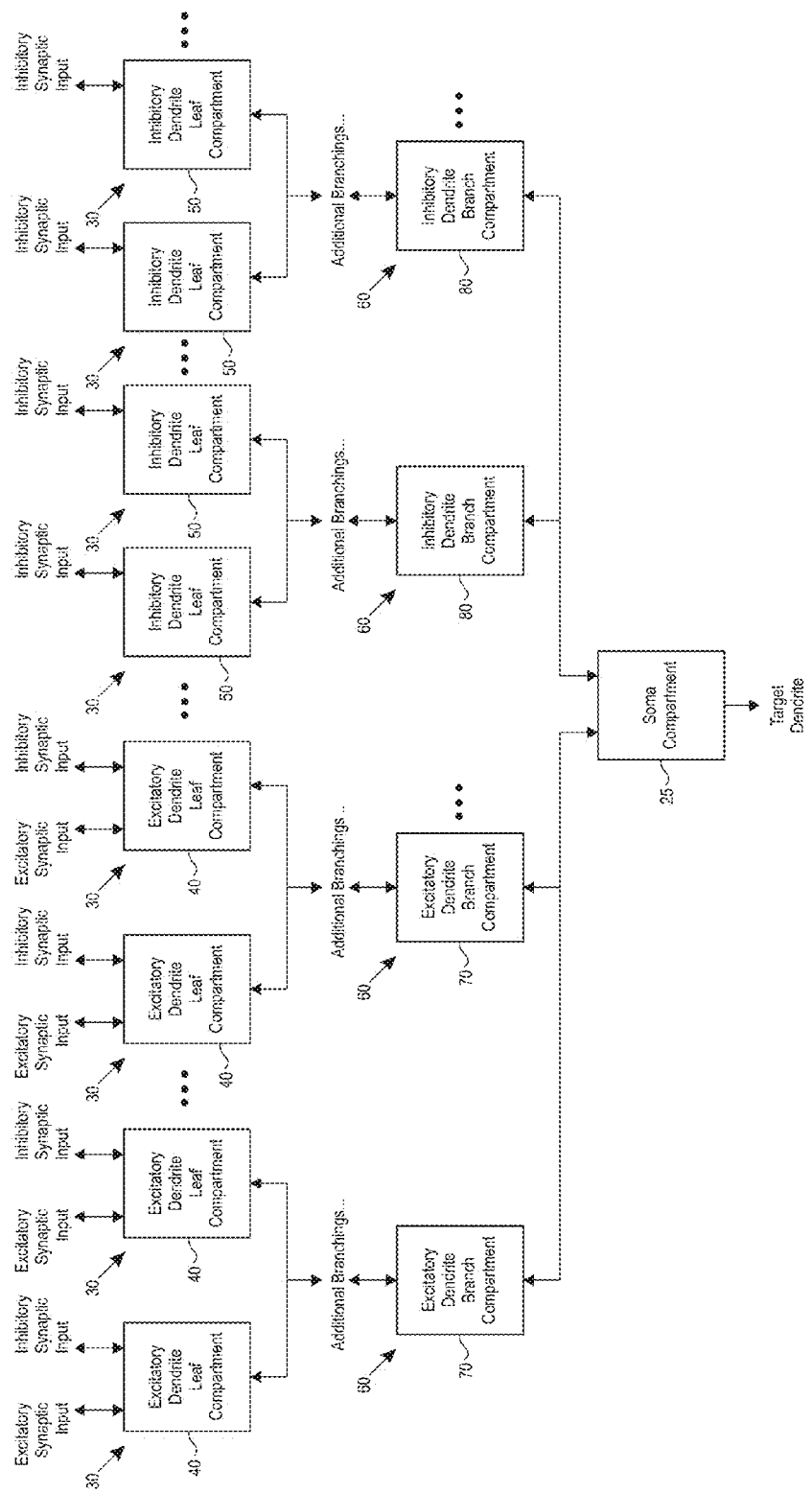
FIG. 6 illustrates a block diagram of an example multi-compartment neuron with somatic inhibition and branching structure, in accordance with an embodiment of the invention.

The multi-level hierarchical structure of a multi-compartment neuron 5 may further comprise multiple intermediate levels, wherein each intermediate level comprises a plurality of dendrite branch compartments 60 (FIGS. 5, 6). The dendrite branch compartments 60 provide a branching structure. A dendrite branch compartment 60 may be an excitatory dendrite branch compartment 70 (FIG. 5) with an $E_i=1$, or an inhibitory dendrite branch compartment 80 (FIG. 6) with an $E_i=0$. An excitatory dendrite branch compartment 70 of one intermediate level is configured to receive excitatory synaptic spikes from either excitatory dendrite leaf compartments 40 of the leaf level or excitatory dendrite branch compartments 70 of another intermediate level. An inhibitory dendrite leaf compartment 80 of one intermediate level is configured to receive inhibitory synaptic spikes from either inhibitory dendrite leaf compartments 50 of the leaf level or inhibitory dendrite branch compartments 80 of another intermediate level. Synaptic spikes are received by the dendrite branch compartments 70, 80 via synaptic connections such as the synaptic cross-bar array 12 (FIG. 1B).

For a multi-compartment neuron 5 without dendrite branch compartments 60, the target compartment for any type of dendrite leaf compartment 30 is a soma compartment 25 of the same multi-compartment neuron 5. Synaptic spikes generated by the dendrite leaf compartment 30 are transmitted to the soma compartment 25 via synaptic connections such as the synaptic crossbar array 12 (FIG. 1B). As such, the source compartments for the soma compartment 25 are the dendrite leaf compartments 30 of the same multi-compartment neuron 5.

For a multi-compartment neuron 5 with dendrite branch compartments 60, the target compartment for a dendrite leaf compartment 30 is a dendrite branch compartment 60 of the same multi-compartment neuron 5. Synaptic spikes generated by the dendrite leaf compartment 30 are transmitted to some dendrite branch compartment 60 via synaptic connections such as the synaptic crossbar array 12 (FIG. 1B). The source compartments for the soma compartment 25 are some dendrite branch compartments 60 within the same multi-compartment neuron 5. Synaptic spikes generated by some dendrite branch compartments 60 are transmitted to the soma compartment 25 via synaptic connections such as the synaptic crossbar array 12 (FIG. 1B).

The spiking compartment 20 may also backward route the spike. In one example implementation, the spiking compartment 20 backward routes the spike to only its source compartments. In another example implementation, the spiking compartment 20 backward routes the spike to its source compartments, each source compartment in turn backward routes the spike to its own source compartments, if any, and so on. The spike is backward routed in this manner to achieve full backward propagation. In yet another example implementation, if the spiking compartment 20 is a soma compartment, the spike is backward routed to all dendritic compartments within the same multi-compartment neuron.

FIGS. 3-6 each illustrate an example multi-level hierarchical structure for a multi-compartment neuron.

Figure 3:
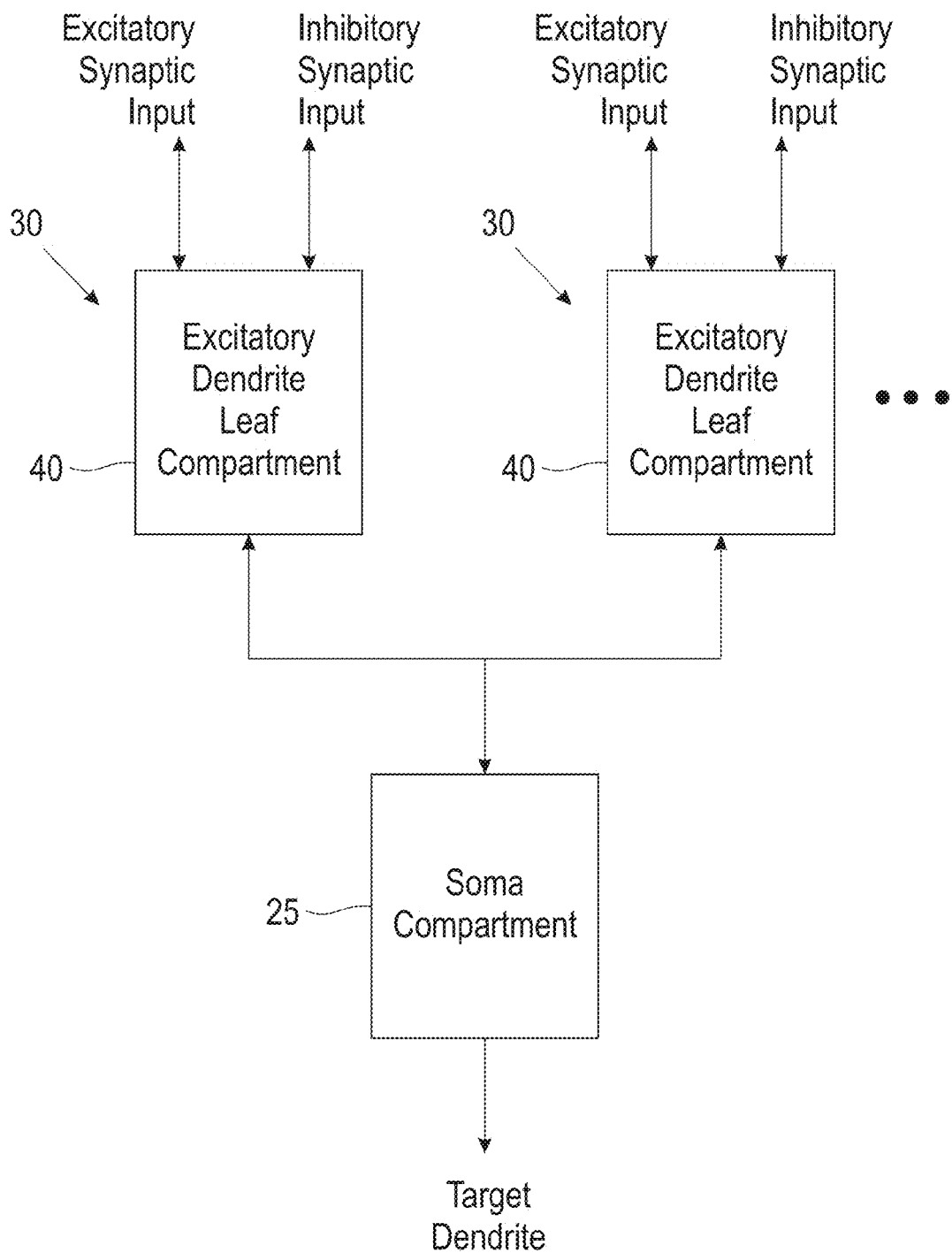
FIG. 3 illustrates a block diagram of an example multi-compartment neuron, in accordance with an embodiment of the invention.

FIG. 3 illustrates a block diagram of an example multi-compartment neuron 100, in accordance with an embodiment of the invention. The multi-compartment neuron 100 comprises a soma compartment 25, and multiple dendrite leaf compartments 30. Specifically, the dendrite leaf compartments 30 are excitatory dendrite leaf compartments 40.

Each excitatory dendrite leaf compartment 40 is connected to the soma compartment 25. The connections between compartments may be bi-directional to allow both forward and backward propagation of spikes.

Each excitatory dendrite leaf compartment 40 is configured to receive and integrate incoming excitatory and inhibitory synaptic spikes from soma compartments 25 of other multi-compartment neurons. For each excitatory dendrite leaf compartment 40, if the integrated synaptic spikes reach a spike threshold $\theta_i$, the excitatory dendrite leaf compartment 40 emits a synaptic spike to its target compartment. As illustrated in FIG. 3, for each excitatory dendrite leaf compartment 40, the target compartment is the soma compartment 25 within the same multi-compartment neuron 100.

The soma compartment 25 is configured to receive and integrate incoming excitatory synaptic spikes from the excitatory dendrite leaf compartments 40 it is connected to. If the integrated synaptic spikes reach the spike threshold $\theta_i$, the soma compartment 25 emits a synaptic spike to its target components. The target compartments for the soma compartment 25 are dendrite leaf compartments 30 of other multi-compartment neurons.

Figure 4:
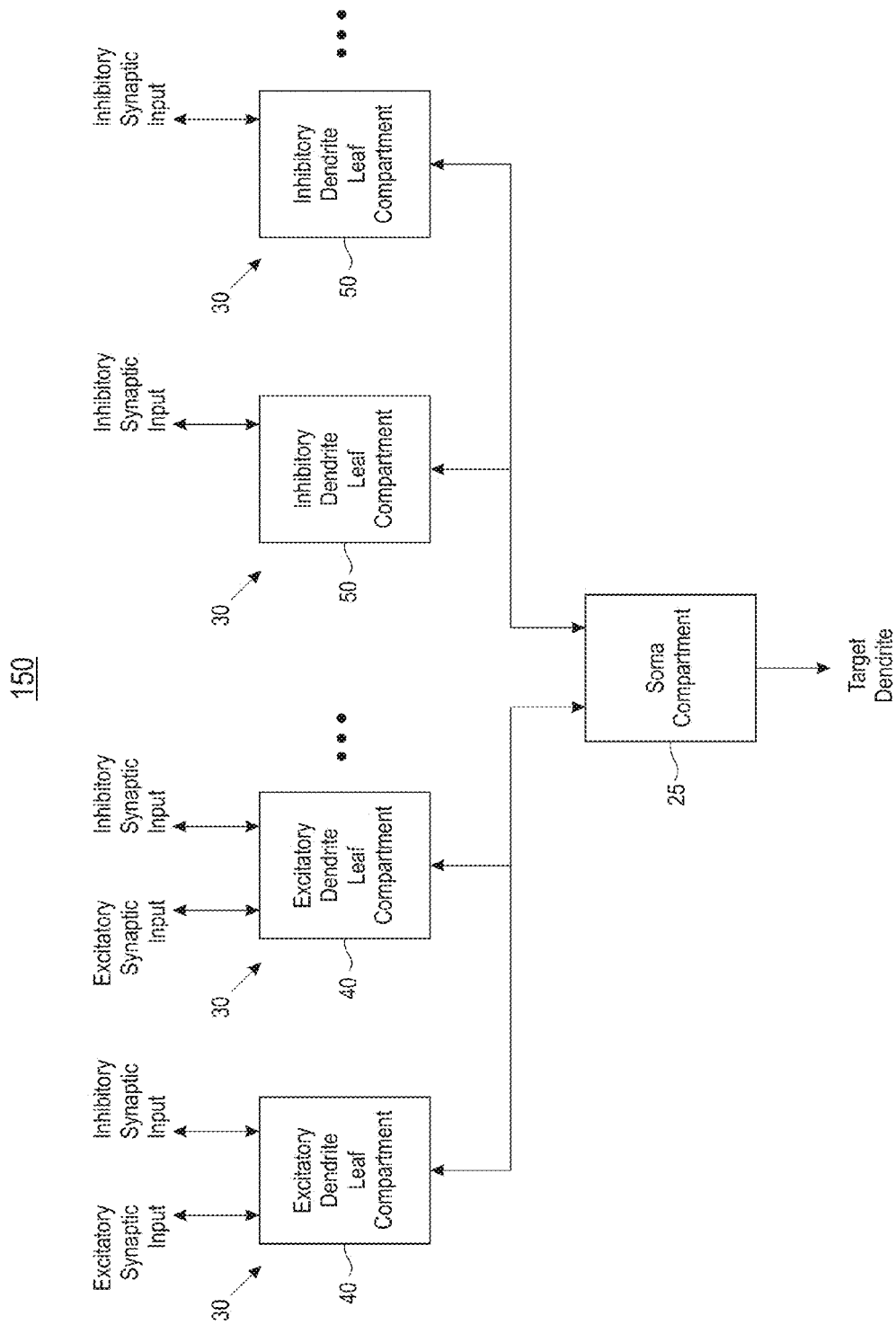
FIG. 4 illustrates a block diagram of an example multi-compartment neuron with somatic inhibition, in accordance with an embodiment of the invention.

FIG. 4 illustrates a block diagram of an example multi-compartment neuron 150 with somatic inhibition, in accordance with an embodiment of the invention. The multi-compartment neuron 150 comprises a soma compartment 25, and multiple dendrite leaf compartments 30. Specifically, the dendrite leaf compartments 30 are excitatory dendrite leaf compartments 40 and inhibitory dendrite leaf compartments 50. As later described in detail herein, the inhibitory dendrite leaf compartments 50 provide somatic inhibition.

Each excitatory dendrite leaf compartment 40 and each inhibitory dendrite leaf compartment 50 is connected to the soma compartment 25. The connections between compartments may be bi-directional to allow both forward and backward propagation of spikes.

Each excitatory dendrite leaf compartment 40 is configured to receive and integrate incoming excitatory and inhibitory synaptic spikes from soma compartments 25 of other multi-compartment neurons. For each excitatory dendrite leaf compartment 40, if the integrated synaptic spikes reach a spike threshold $\theta_i$, the excitatory dendrite leaf compartment 40 emits a synaptic spike to its target compartment. As illustrated in FIG. 4, for each excitatory dendrite leaf compartment 40, the target compartment is the soma compartment 25 within the same multi-compartment neuron 150.

Each inhibitory dendrite leaf compartment 50 is configured to receive and integrate incoming inhibitory synaptic spikes from soma compartments 25 of other multi-compartment neurons. For each inhibitory dendrite leaf compartment 50, incoming inhibitory synaptic spikes produce an increase in the inhibitory dendrite leaf compartment's membrane potential. As such, the inhibitory dendrite leaf compartment 50 emits an inhibitory synaptic spike to its target component when it receives incoming inhibitory synaptic spikes. As illustrated in FIG. 4, for each inhibitory dendrite leaf compartment 40, the target compartment is the soma compartment 25 within the same multi-compartment neuron 150.

The soma compartment 25 is configured to receive and integrate incoming excitatory synaptic spikes from the excitatory dendrite leaf compartments 40 it is connected to. The soma compartment 25 is further configured to receive and integrate incoming inhibitory synaptic spikes from the inhibitory dendrite leaf compartments 50 it is connected to. If the integrated synaptic spikes reach a spike threshold $\theta_i$, the soma compartment 25 emits a synaptic spike to its target components. The target compartments for the soma compartment 25 are dendrite leaf compartments 30 of other multi-compartment neurons.

FIG. 5 illustrates a block diagram of an example multi-compartment neuron 200 with branching structure, in accordance with an embodiment of the invention. The multi-compartment neuron 200 comprises a soma compartment 25, and multiple dendrite leaf compartments 30. Specifically, the dendrite leaf compartments 30 are excitatory dendrite leaf compartments 40. The multi-compartment neuron 200 further comprises multiple dendrite branch compartments 60. Specifically, the dendrite branch compartments 60 are excitatory dendrite branch compartments 70.

Each excitatory dendrite leaf compartment 40 is connected to an excitatory dendrite branch compartment 70. Each excitatory dendrite branch compartment 70 is connected to another excitatory dendrite branch compartment 70 or the soma compartment 25. There are no reciprocal loops between the compartments. The connections between compartments may be bi-directional to allow both forward and backward propagation of spikes.

Each excitatory dendrite leaf compartment 40 is configured to receive and integrate incoming excitatory and inhibitory synaptic spikes from soma compartments 25 of other multi-compartment neurons. For each excitatory dendrite leaf compartment 40, if the integrated synaptic spikes reach a spike threshold $\theta_i$, the excitatory dendrite leaf compartment 40 emits a synaptic spike to its target compartment. As illustrated in FIG. 5, for each excitatory dendrite leaf compartment 40, the target compartment is an excitatory dendrite branch compartment 70 within the same multi-compartment neuron 200.

Each excitatory dendrite branch compartment 70 is configured to receive and integrate incoming excitatory synaptic spikes from the excitatory dendrite leaf compartments 40 it is connected to. For each excitatory dendrite branch compartment 70, if the integrated synaptic spikes reach a spike threshold $\theta_j$, the excitatory dendrite branch compartment 70 emits a synaptic spike to its target component. As illustrated in FIG. 5, for each excitatory dendrite branch compartment 70, the target compartment is another excitatory dendrite branch compartment 70 or the soma compartment 25 within the same multi-compartment neuron 200.

The soma compartment 25 is configured to receive and integrate incoming excitatory synaptic spikes from the excitatory dendrite branch compartments 70 it is connected to. If the integrated synaptic spikes reach the spike threshold $\theta_j$, the soma compartment 25 emits a synaptic spike to its target components. The target compartments for the soma compartment 25 are dendrite leaf compartments 30 of other multi-compartment neurons.

FIG. 6 illustrates a block diagram of an example multi-compartment neuron 250 with somatic inhibition and branching structure, in accordance with an embodiment of the invention. The multi-compartment neuron 250 comprises a soma compartment 25, and multiple dendrite leaf compartments 30. Specifically, the dendrite leaf compartments 30 are excitatory dendrite leaf compartments 40 and inhibitory dendrite leaf compartments 50. As later described in detail herein, the inhibitory dendrite leaf compartments 50 provide somatic inhibition. The multi-compartment neuron 250 further comprises multiple dendrite branch compartments 60. Specifically, the dendrite branch compartments 60 are excitatory dendrite branch compartments 70 and inhibitory dendrite branch compartments 80.

Each excitatory compartment 40, 70 within the multi-compartment neuron 250 communicates with other excitatory compartments 40, 70 or the soma compartment 25. Each inhibitory compartment 50, 80 within the multi-compartment neuron 250 communicates with other inhibitory compartments 50, 80 or the soma compartment 25. Specifically, each excitatory dendrite leaf compartment 40 is connected to an excitatory dendrite branch compartment 70. Each inhibitory dendrite leaf compartment 50 is connected to an inhibitory dendrite branch compartment 80. Each excitatory dendrite branch compartment 70 is connected to another excitatory dendrite branch compartment 70 or the soma compartment 25. Each inhibitory dendrite branch compartment 80 is connected to another inhibitory dendrite branch compartment 80 or the soma compartment 25. There are no reciprocal loops between the compartments. The connections between compartments may be bi-directional to allow both forward and backward propagation of spikes.

Each excitatory dendrite leaf compartment 40 is configured to receive and integrate incoming excitatory and inhibitory synaptic spikes from soma compartments 25 of other multi-compartment neurons. For each excitatory dendrite leaf compartment 40, if the integrated synaptic spikes reach a spike threshold $\theta_j$, the excitatory dendrite leaf compartment 40 emits a synaptic spike to its target compartment. As illustrated in FIG. 6, for each excitatory dendrite leaf compartment 40, the target compartment is an excitatory dendrite branch compartment 70 within the same multi-compartment neuron 250.

Each inhibitory dendrite leaf compartment 50 is configured to receive and integrate incoming inhibitory synaptic spikes from soma compartments 25 of other multi-compartment neurons. For each inhibitory dendrite leaf compartment 50, incoming inhibitory synaptic spikes produce an increase in the membrane potential variable $V_i$ of said inhibitory dendrite leaf compartment 50. As such, the inhibitory dendrite leaf compartment 50 emits an inhibitory synaptic spike to its target component when it receives incoming inhibitory synaptic spikes. As illustrated in FIG. 6, for each inhibitory dendrite leaf compartment 50, the target compartment is an inhibitory dendrite branch compartment 80 within the same multi-compartment neuron 250.

Each excitatory dendrite branch compartment 70 is configured to receive and integrate incoming excitatory synaptic spikes from the excitatory dendrite leaf compartments 40 it is connected to. For each excitatory dendrite branch compartment 70, if the integrated synaptic spikes reach a spike threshold $\theta_j$, the excitatory dendrite branch compartment 70 emits a synaptic spike to its target component. As illustrated in FIG. 6, for each excitatory dendrite branch compartment 70, the target compartment is another excitatory dendrite branch compartment 70 or the soma compartment 25 within the same multi-compartment neuron 250.

Each inhibitory dendrite branch compartment 80 is configured to receive and integrate incoming inhibitory synaptic spikes from the inhibitory dendrite leaf compartments 50 it is connected to. For each inhibitory dendrite branch compartment 80, incoming inhibitory synaptic spikes produce an increase in the membrane potential variable $V_i$ of said inhibitory dendrite branch compartment 80. As such, the inhibitory dendrite branch compartment 80 emits an inhibitory synaptic spike to its target component when it receives incoming inhibitory synaptic spikes. As illustrated in FIG. 6, for each inhibitory dendrite branch compartment 80, the target compartment is another inhibitory dendrite branch compartment 80 or the soma compartment 25 within the same multi-compartment neuron 250.

The soma compartment 25 is configured to receive and integrate incoming excitatory synaptic spikes from the excitatory dendrite branch compartments 70 it is connected to. The soma compartment 25 is further configured to receive and integrate incoming inhibitory synaptic spikes from the inhibitory dendrite branch compartments 80 it is connected to. If the integrated synaptic spikes reach a spike threshold $\theta_j$, the soma compartment 25 emits a synaptic spike to its target components. The target compartments for the soma compartment 25 are dendrite leaf compartments 30 of other multi-compartment neurons.

Figure 7:
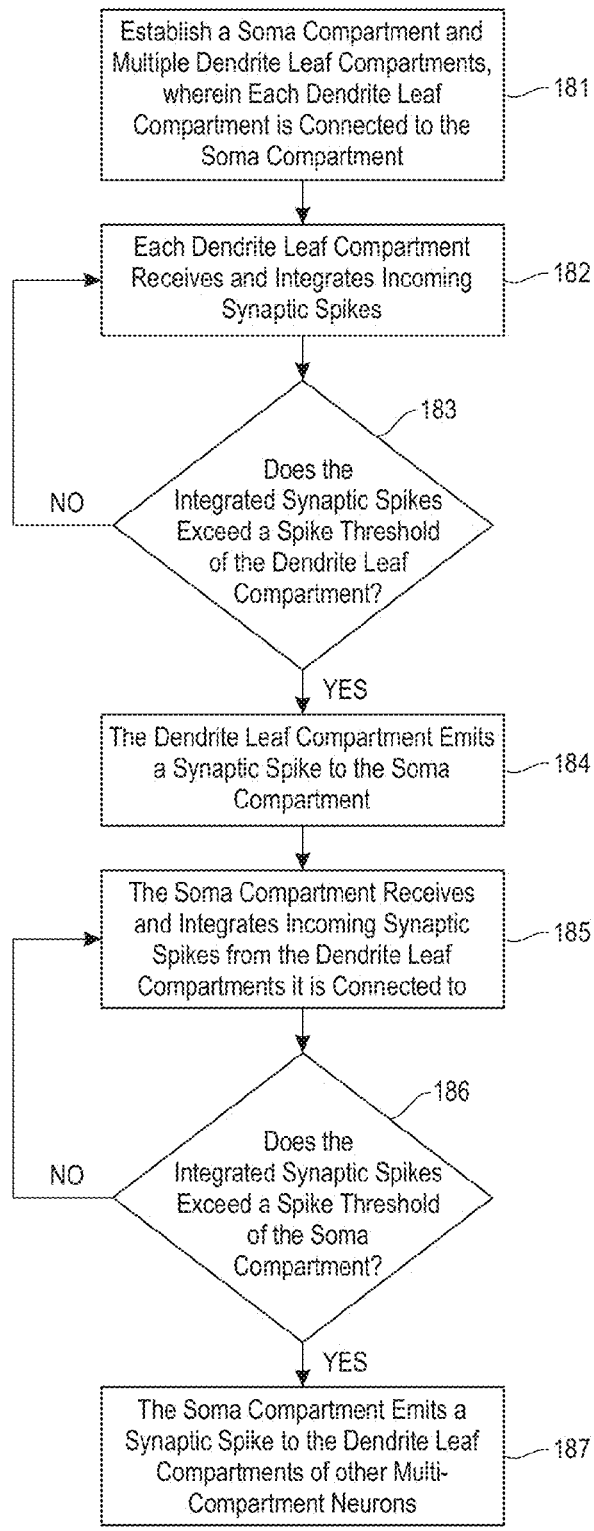
FIG. 7 illustrates a flowchart of an example process for a multi-compartment neuron, in accordance with an embodiment of the invention.

FIG. 7 illustrates a flowchart of an example process 180 for a multi-compartment neuron, in accordance with an embodiment of the invention. In process block 181, establish a soma compartment and multiple dendrite leaf compartments, wherein each dendrite leaf compartment is connected to the soma compartment. In this example process 180, the multi-compartment neuron has no dendrite branch compartments. In process block 182, each dendrite leaf compartment receives and integrates incoming synaptic spikes from the soma compartments of other multi-compartment neurons via synaptic connections such as a synaptic crossbar array. In process block 183, for each dendrite leaf compartment, determine if the integrated synaptic spikes reach a spike threshold of the dendrite leaf compartment. If the spike threshold is reached, emit a synaptic spike to the soma compartment it is connected to as in process block 184. If the spike threshold is not reached, loop back to process block 182.

In process block 185, the soma compartment receives and integrates incoming synaptic spikes from the dendrite leaf compartments it is connected to. In process block 186, determine if the integrated synaptic spikes reach a spike threshold of the soma compartment. If the spike threshold is reached, the soma compartment emits a synaptic spike to the dendrite leaf compartments of other multi-compartment neurons via synaptic connections such as the synaptic crossbar array as in process block 187. If the spike threshold is not reached, loop back to process block 185.

In one embodiment, the present invention may be implemented using a computer system including multiple processors. Each processor may have rapid access to a block of main memory assigned to said processor. Each processor is configured to compute the entire state of a particular neural module. Information pertaining to the neural module is stored on the block of main memory block assigned to said processor, thereby enabling rapid access to said information.

Communication between processors may be much slower than communication between a processor and the block of main memory assigned to it. Communication between a processor and a block of main memory not assigned to it may also be much slower than communication between the processor and the block of main memory assigned to it. As such, communication between neural modules, that is communication between processors or communication between a processor and a block of main memory not assigned to it, may be handled using spikes of compact binary signals. The spikes help minimize communication bandwidth between neural modules.

In yet another embodiment, multiple neurosynaptic cores may be used. Each core comprises a crossbar of synapses (FIG. 1B) with m axonal input lines and n dendritic output lines that feed into n electronic neurons. Each neuron of a core can connect to one axon line on any core using a routing system. Each compartment 20 (FIG. 1A) of a multi-compartment neuron 5 (FIG. 1A) may be implemented as a neuron of a core. Each compartment 20 may be individually configured to receive input from up to m sources through its axonal input lines. As such, each dendrite leaf compartment 30 (FIG. 3) may receive up to m external inputs. The inputs received may then be transferred directly or indirectly through the multi-level hierarchical structure of the multi-compartment neuron 5, to the soma compartment 25. This allows the soma compartment 25 to process inputs arriving from more than m sources.

Figure 8:
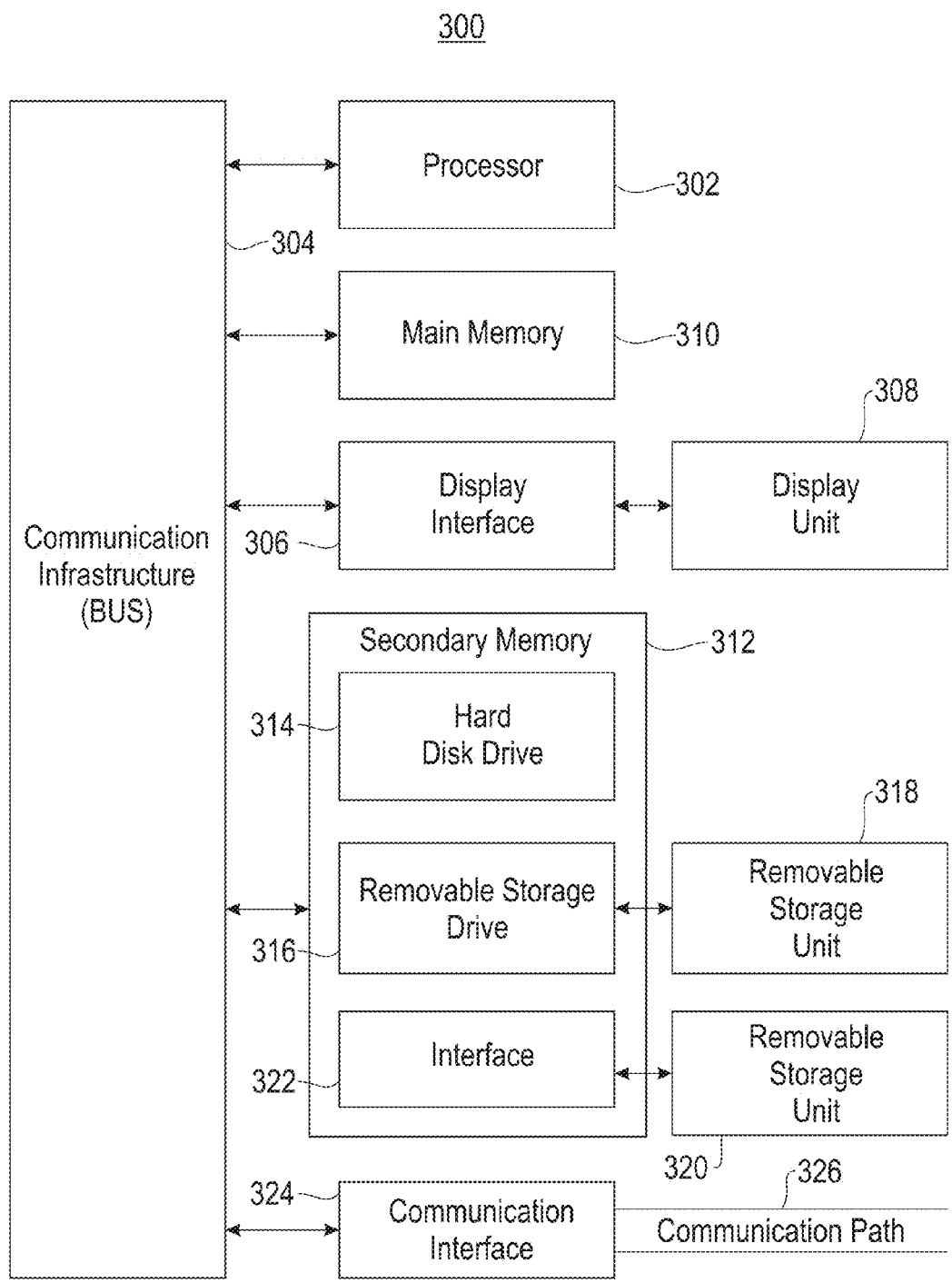
FIG. 8 is a high level block diagram showing an information processing circuit useful for implementing one embodiment of the present invention.

FIG. 8 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for hierarchical routing and two-way information flow with structural plasticity in neural networks. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A neural module comprising:
  a multilevel hierarchical structure of different types of neural compartments, wherein each neural compartment is individually customizable, and wherein each neural compartment is interconnected to one or more neural compartments of a previous hierarchical level and a next hierarchical level in the hierarchical structure;
  wherein each neural compartment is configured to:
    integrate spike signals from interconnected neural compartments of a previous hierarchical level;
    generate a spike signal in response to the integrated spike signals reaching a threshold of said neural compartment; and
    deliver a generated spike signal to interconnected neural compartments of a next hierarchical level;
  wherein the neural module has a corresponding hardware processor.

2. The neural module of claim 1, wherein:
  the multilevel hierarchical structure includes one or more of the following types of neural compartments: a soma compartment, a dendrite leaf compartment, and a dendrite branch compartment;
  each type of neural compartment has a corresponding set of parameters that are individually customizable; and
  each neural compartment is further interconnected to one or more external spiking systems, such that said neural compartment is further configured to:
    integrate spike signals from interconnected external spiking systems; and
    deliver a generated spike signal to interconnected external spiking systems;
    wherein each external spiking system is one of the following: another neural module, a sensory module, and a motor module.

3. The neural module of claim 2, wherein the multilevel hierarchical structure is a tree structure.

4. The neural module of claim 3, wherein each neural compartment comprises:
  multiple input ports for receiving spike signals;
  an integrator unit for integrating the spike signals received; and
  a threshold check unit for determining whether the integrated spike signals reach the threshold of said neural compartment.

5. The neural module of claim 2, wherein the multilevel hierarchical structure comprises:
  a root level comprising one soma compartment; and
  a leaf level comprising a plurality of dendrite leaf compartments.

6. The neural module of claim 5, wherein the soma compartment of the root level is interconnected to every dendrite leaf compartment of the leaf level.

7. The neural module of claim 5, wherein the multilevel hierarchical structure further comprises:
  zero or more intermediate levels, wherein each intermediate level comprises a plurality of dendrite branch compartments;
  wherein each dendrite branch compartment is interconnected to one or more dendrite branch compartments of a previous intermediate level and a next intermediate level, if any;
  wherein dendrite branch compartments of a first intermediate level are interconnected to multiple dendrite leaf compartments of the leaf level; and
  wherein dendrite branch compartments of a last intermediate level are interconnected to the soma compartment of the root level.

8. The neural module of claim 7, wherein the plurality of dendrite leaf compartments of the leaf level is divided into a first and a second population of dendrite leaf compartments.

9. The neural module of claim 8, wherein:
  each dendrite leaf compartment of the first population of dendrite leaf compartments:
    receives excitatory spike signals and inhibitory spike signals; and
    generates an excitatory spike signal in response to the integrated spike signals reaching a threshold of said dendrite leaf compartment; and
  each dendrite leaf compartment of the second population of dendrite leaf compartments:
    receives inhibitory spike signals; and
    generates an inhibitory spike signal in response to the integrated spike signals reaching a threshold of said dendrite leaf compartment.

10. The neural module of claim 9, wherein:
  for each intermediate level, the plurality of dendrite branch compartments of said intermediate level is divided into a first and a second population of dendrite branch compartments.

11. The neural module of claim 10, wherein:
  each dendrite branch compartment of the first population of dendrite branch compartments:
    receives excitatory spike signals; and
    generates an excitatory spike signal in response to the integrated spike signals reaching a threshold of said dendrite branch compartment; and
  each dendrite branch compartment of the second population of dendrite branch compartments:
    receives inhibitory spike signals; and
    generates an inhibitory spike signal in response to the integrated spike signals reaching a threshold of said dendrite branch compartment;
  wherein the first population of dendrite leaf compartments and the first population of dendrite branch compartments integrate spike signals in accordance with a first formula; and
  wherein the second population of dendrite leaf compartments and the second population of dendrite branch compartments integrate spike signals in accordance with a second formula that is different from the first formula.

12. The neural module of claim 7, wherein:
  the soma compartment of the root level delivers a back-spike signal to neural compartments of a previous hierarchical level when the soma compartment generates a spike signal; and each dendrite branch compartment delivers a backspike signal to neural compartments of a previous hierarchical level when said dendrite branch compartment receives a backspike signal.

13. The neural module of claim 5, wherein:
the neural module is organized into a neural network including multiple neural modules interconnected via an interconnection network comprising multiple digital synapses, wherein each synapse interconnects one neural module to another neural module;
each neural compartment of each neural module is further configured to deliver a generated spike signal to an interconnected neural compartment in said neural module or a different neural module; and
for each neural module:
a soma compartment of said neural module is interconnected to one or more of the following: dendrite leaf compartments of other neural modules, and external spiking systems; and
each dendrite leaf compartment of said neural module is interconnected to one or more of the following: soma compartments of other neural modules, and external spiking systems.

14. The neural module of claim 13, wherein the neural network is instantiated using a distributed hardware architecture, such that:
for each neural module, all operational states of said neural module is computed by a corresponding hardware processor; and
the neural modules in the neural network communicate using spikes.

15. The neural module of claim 14, wherein the neural network is instantiated using a hardware architecture comprising multiple core circuits, such that:
for each neural module, all operational states of said neural module is computed by a corresponding core circuit; and
the neural modules in the neural network communicate using spikes;
wherein each core circuit comprises an electronic synapse array including multiple digital synapses interconnecting a plurality of digital electronic neurons, and wherein each neuron represents a neural compartment.

16. A method comprising:
producing spiking computation in a neural module, said neural module comprising a multilevel hierarchical structure of different types of neural compartments, wherein each neural compartment is individually customizable, and wherein each neural compartment is interconnected to one or more neural compartments of a previous hierarchical level and a next hierarchical level in the hierarchical structure;
wherein said spiking computation comprises:
for each neural compartment:
integrating spike signals from interconnected neural compartments of a previous hierarchical level;
generating a spike signal in response to the integrated spike signals reaching a threshold of said neural compartment; and
delivering a generated spike signal to interconnected neural compartments of a next hierarchical level.

17. The method of claim 16, wherein:
the multilevel hierarchical structure includes one or more of the following types of neural compartments: a soma compartment, a dendrite leaf compartment, and a dendrite branch compartment;
each type of neural compartment has a corresponding set of parameters that are individually customizable; and
each neural compartment is further interconnected to one or more external spiking systems, such that said spiking computation further comprises:
for each neural compartment:
integrating spike signals from interconnected external spiking systems; and
delivering a generated spike signal to interconnected external spiking systems;
wherein each external spiking system is one of the following:
another neural module, a sensory module, and a motor module.

18. The method of claim 17, wherein the multilevel hierarchical structure comprises:
a root level comprising one soma compartment; and
a leaf level comprising a plurality of dendrite leaf compartments.

19. The method of claim 18, wherein the soma compartment of the root level is interconnected to every dendrite leaf compartment of the leaf level.

20. The method of claim 18, wherein the multilevel hierarchical structure further comprises:
zero or more intermediate levels, wherein each intermediate level comprises a plurality of dendrite branch compartments;
wherein each dendrite branch compartment is interconnected to one or more dendrite branch compartments of a previous intermediate level and a next intermediate level, if any;
wherein dendrite branch compartments of the first intermediate level are interconnected to multiple dendrite leaf compartments of the leaf level; and
wherein dendrite branch compartments of the last intermediate level are interconnected to the soma compartment of the root level.

21. The method of claim 20, wherein:
the plurality of dendrite leaf compartments of the leaf level is divided into a first and a second population of dendrite leaf compartments; and
said spiking computation further comprises:
for each dendrite leaf compartment of the first population of dendrite leaf compartments:
receiving excitatory spike signals and inhibitory spike signals; and
generating an excitatory spike signal in response to the integrated spike signals reaching a threshold of said dendrite leaf compartment; and
for each dendrite leaf compartment of the second population of dendrite leaf compartments:
receiving inhibitory spike signals; and
generating an inhibitory spike signal in response to the integrated spike signals reaching a threshold of said dendrite leaf compartment.

22. The method of claim 21, wherein:
for each intermediate level, the plurality of dendrite branch compartments of said intermediate level is divided into a first and a second population of dendrite branch compartments; and
said spiking computation further comprises:
for each dendrite branch compartment of the first population of dendrite branch compartments:
receiving excitatory spike signals; and
generating an excitatory spike signal in response to the integrated spike signals reaching a threshold of said dendrite branch compartment; and
for each dendrite branch compartment of the second population of dendrite branch compartments:

receiving inhibitory spike signals; and generating an inhibitory spike signal in response to the integrated spike signals reaching a threshold of said dendrite branch compartment;

wherein the first population of dendrite leaf compartments and the first population of dendrite branch compartments integrate spike signals in accordance with a first formula; and wherein the second population of dendrite leaf compartments and the second population of dendrite branch compartments integrate spike signals in accordance with a second formula that is different from the first formula.

23. The method of claim 20, wherein said spiking computation further comprises:

for the soma compartment of the root level, delivering a backspike signal to neural compartments of a previous hierarchical level when the soma compartment generates a spike signal; and for each dendrite branch compartment, delivering a backspike signal to neural compartments of a previous hierarchical level when said dendrite branch compartment receives a backspike signal.

24. A non-transitory computer-useable storage medium for producing spiking computation in a neural module, said neural module comprising a multilevel hierarchical structure of neural compartments, wherein each neural compartment is interconnected to one or more neural compartments of a previous hierarchical level and a next hierarchical level in the hierarchical structure, the computer-useable storage medium having a computer-readable program, wherein the program upon being processed on a computer causes the computer to implement the steps of:

in each neural compartment, integrating spike signals from interconnected neural compartments of a previous hierarchical level;

in each neural compartment, generating a spike signal in response to the integrated spike signals reaching a threshold of said neural compartment;

in each neural compartment, delivering a generated spike signal to interconnected neural compartments of a next hierarchical level;

interconnecting each neural compartment to one or more external spiking systems, wherein each external spiking system is one of the following: another neural module, a sensory module, and a motor module;

in each neural compartment, integrating spike signals from interconnected external spiking systems;

in each neural compartment, delivering a generated spike signal to interconnected external spiking systems; and in each neural compartment, delivering a backspike signal to neural compartments of a previous hierarchical level when said neural compartment generates a spike signal or receives a backspike signal;

wherein the multilevel hierarchical structure includes different types of neural compartments; and wherein each neural compartment is individually customizable.

\* \* \* \* \*